United States Patent [19]

Timmerman et al.

[11] Patent Number: 5,646,210
[45] Date of Patent: Jul. 8, 1997

[54] METHOD FOR THE PREPARATION OF POLYMERIC SPACING PARTICLES

[75] Inventors: Daniel Timmerman, Mortsel; Ronny De Clercq, Aalter; Geert Defieuw, Kessel-Lo, all of Belgium; Wolfgang Podszun, Köln, Germany; Rainer Brandt, Walsrode, Germany

[73] Assignee: AGFA-Gevaert, N.V., Mortsel, Belgium

[21] Appl. No.: 515,209

[22] Filed: Aug. 15, 1995

[30] Foreign Application Priority Data

Aug. 24, 1994 [EP] European Pat. Off. ............ 94202424

[51] Int. Cl.$^6$ ........................................... C08F 2/16
[52] U.S. Cl. ................. 525/288; 524/458; 524/460; 524/504; 524/535
[58] Field of Search ........................ 524/504, 521, 524/458, 460, 535; 525/63, 64, 69, 100, 101, 288

[56] References Cited

U.S. PATENT DOCUMENTS

| 4,333,867 | 6/1982 | Sauntson. | |
|---|---|---|---|
| 4,614,708 | 9/1986 | Timmerman et al. | 430/517 |
| 5,252,660 | 10/1993 | Hazan et al. | 524/504 |

*Primary Examiner*—Thorl Chea
*Attorney, Agent, or Firm*—Breiner & Breiner

[57] ABSTRACT

A method is provided for the preparation of finely divided solid spherical polymer beads having an average particle size between about 0.1 and about 10 μm and having a glass transition temperature of at least 40° C. The method is a one step reaction in an aqueous reaction medium and said polymer beads are formed by the simultaneous reaction of 1) a silane monomer comprising an α,β-ethylenically unsaturated group,
2) at least one α,β-ethylenically unsaturated monomer, different from said silane monomer, capable of forming a polymer that is soluble in the monomer(s) present in said aqueous solvent mixture but which is insoluble in water
3) a free radical-forming polymerization initiator that is soluble in the aqueous solvent mixture, and
4) a graft-polymerizable polymer containing hydrophilic groups, and capable of forming a graft polymer that remains soluble in the aqueous reaction mixture.

9 Claims, No Drawings

METHOD FOR THE PREPARATION OF POLYMERIC SPACING PARTICLES

FIELD OF THE INVENTION

The present invention relates to a method for preparing finely divided solid polymer beads that are insoluble in water, in organic solvents, and in mixtures of water and organic solvents and are heat-proof. The invention also relates to the use of such polymer beads as spacing agents in polymeric sheet or web materials.

BACKGROUND OF THE INVENTION

The use of polymer beads with diameters in the range of 0.5 to 20 µm as spacer particles is well known. The use of such polymeric beads as spacer in photosenstive materials is disclosed in e.g. U.S. Pat. No. 4,614,708, U.S. Pat. No. 5,252,445, U.S. Pat. No. 5,057,407, EP 281 928 etc. Also in the manufacture of polymeric sheets or webs intended for, e.g., use as packaging material the use of polymeric spacer particles is known, e.g. in DE-OS 39 30 141 polymeric spacers useful in the manufacture of polymeric webs or sheets for packaging are disclosed.

In both uses said polymeric spacer particles improve the antistatic properties of the material and prevent blocking of the sheet or web material.

Given the different applications of polymeric spacing particles, it is clear that such particles have to fulfil several requirements. Polymeric spacer particles have, e.g., to be insoluble in organic solvents, insoluble in water but dispersable in water or at least in hydrophilic dispersing media. When used in the production of polymeric sheet or web materials the polymeric spacer particles have to be heat resistant, even in an atmosphere containing oxygen. Apart from the physical and chemical properties, polymeric spacer particles are needed in a wide range of average particle sizes, ranging from 0.1 µm to 20 µm.

In EP 466 982 a method is provided for preparing finely divided solid polymer beads that are insoluble in water, in organic solvents, and in mixtures of water and organic solvents, that have an average particle size in the range of from 0.5 to 5 µm and have a glass transition temperature of at least 40° C. These particles have also proven to be heat stable, up to about 220° to 250° C. However this method is rather complicated since it comprises four consecutive steps and with this method it is very difficult to produce polymer beads with average particles size≧5 µm.

In DE 39 30 141, a two step reaction for the manufacture of polymer beads with average particle size between 3.5 µm and 10 µm is described. The spacer particles do show a narrow size distribution and are insoluble in organic solvents as well as heat resistant. However with the teachings of this disclosure, it is only possible to produce the spacing particles in a non-aqueous organic solvent mixture. In DE 39 30 141 it is disclosed to use organic solvent mixture comprising at most 5% water. Production procedures using organic solvents are from the view point of solvent containment and ecology less desirable. On the other hand, with the procedure disclosed in DE 39 30 141 it is very difficult to produce polymer beads with average particle size≧3.5 µm.

In EP-B 080 225 and the corresponding U.S. Pat. No. 4,861,818 a single step method for the formation of polymer beads in an aqueous environment is disclosed, but the polymer beads produced according to the method of that disclosure are not cross-linked and are insufficiently insoluble in organic solvents and insufficiently heat resistant.

There is still a need for a simple method (single step reaction) to produce polymer beads that are insoluble in organic solvents and heat resistant.

OBJECT AND SUMMARY OF THE INVENTION

It is an object of the invention to provide a method for producing polymer beads that makes it possible to use an aqueous reaction medium and a single step reaction.

It is an other object of the invention to provide a method to produce polymer beads that makes it possible to control easily the average particle size within a wide range of sizes.

It is still a further object of the invention to provide a method to produce polymer beads that makes it possible to produce polymer beads with a narrow size distribution.

It is a further object of the invention to provide a method for producing polymer beads that can easily be separated from the reaction mixture and dried, without conglomeration of said spacing particles.

It is still an other object of the invention to provide heat resistant polymer beads that are insoluble in organic solvents.

It is a further object of the invention to provide spherical polymer beads, that when dried, have a good flowability.

Further objects and advantages of the present invention will become clear from the description hereinafter.

The above objects of the invention are realized by providing a method for the preparation of finely divided solid spherical polymer beads having an average particle size between about 0.1 and about 10 µm and having a glass transition temperature of at least 40° C., comprising the steps of:

A) dissolving in an aqueous reaction medium:
1) a silane monomer corresponding to the following general formula:

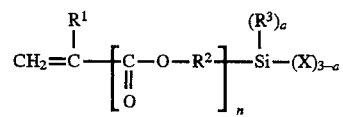

wherein
$R^1$=H or $CH_3$
$R^2$=a linear or branched $C_2$-$C_{12}$—alkylene group, the chain of which may be interrupted by at least one member selected from the group consisting of —O—, —NH—, —COO— or —NH—COO— groups
$R^3$=a linear or branched $C_1$-$C_6$ alkyl group or a phenyl group
X=a hydrolysable group
a=0, 1 or 2
n=0 or 1

2) at least one α,β-ethylenically unsaturated monomer, different from said silane monomer(s), capable of forming a polymer that is soluble in the α,β-ethylenically unsaturated monomer(s) present in said aqueous reaction medium but which is insoluble in water 3) a free radical-forming polymerization initiator that is soluble in the aqueous reaction medium, and 4) a graft-polymerizable polymer containing hydrophilic groups, and capable of forming a graft polymer that remains soluble in said aqueous reaction medium, wherein the amount of said silane monomer present in said aqueous reaction medium is higher than 1% and lower than 25% in weight with respect to the total monomer content and the weight ratio of said graft-polymerizable polymer to said monomer(s) is in the range from 1.0:100 to 8:100 and the weight ratio of polymerization initiator to monomer(s) from 0.1:100 to 6:100, and B) heating the solution to a temperature from 50° C. to the reflux temperature thereof with continuous stirring.

In a preferred embodiment said graft-polymerizable polymer is co((styrene/maleic acid monosodium salt) and said silane monomer is present in the aqueous reaction medium for between 2 and 15% in weight (% w/w) with respect to the total monomer content.

In a further preferred embodiment, said α,β-ethylenically unsaturated monomer, different from said silane monomer (s), is a mixture of at least two monomers selected from the group consisting of methylacrylate, methylmethacrylate, stearylacrylate and stearylmethacrylate. Most preferred said mixture of two monomers comprises a methylester of either acrylic acid or methacrylic acid together with a stearylester of either acrylic acid or methacrylic acid.

DETAILED DESCRIPTION OF THE INVENTION

The production of hardened (cross-linked) polymer beads, using silane monomers, has been described in EP-A 417 539. The cross-linking reaction is initiated after the termination of the polymerization reaction by adding water (either acidified or alkalinized) to the reaction mixture. The disclosure states that during the polymerization reaction only a minimal amount of water (less than 5%) can be present.

It has now been found that, when performing the polymerization reaction in an aqueous reaction medium, the polymerization reaction and cross-linking reaction occur simultaneously, and the hardened (cross-linked) polymer beads can be produced in a single step reaction.

An aqueous reaction medium according to the present invention may comprise, besides water, any polar organic liquid that is substantially miscible with water. Mixtures of several polar organic liquids can be used also together with water to form the aqueous reaction medium.

Suitable polar organic liquids that are substantially miscible with water and that are solvents for the monomer(s) added are the lower alcohols e.g. methanol, ethanol, isopropanol, and mono lower alkylethers of ethyleneglycol or diethylene glycol and dioxan, acetone, acetonitrile, dimethylformamide, etc.

The organic solvent(s) and the proportion thereof to the water present in the aqueous reaction medium are chosen such that prior to the polymerization the aqueous reaction medium is a solvent for the graft-polymerizable polymer containing hydrophilic groups, for the silane monomer(s), for the α,β-ethylenically unsaturated monomer(s), different from said silane monomer(s), and for the initiator, and that after the polymerization it is a non-solvent for the polymer obtained from the monomer(s) but remains a solvent for the graft polymer formed. It has been found that the diameter of the polymer beads, formed by the method according to the present invention, can not only be varied by the reaction temperature, the kind of reagents and the concentration of said reagents, but also by the ratio of organic solvent to water in the aqueous reaction medium. As preferred organic solvent, in the method according to the present invention, lower aliphatic alcohols are used and the weight ratio of lower aliphatic alcohol to water is comprised between 40:60 and 85:15.

The silane monomers are of the formula:

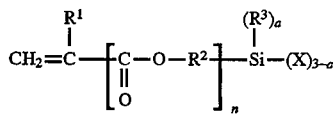

wherein $R^1$=H or $CH_3$ $R^2$=a linear or branched $C_2$-$C_{12}$—alkylene group, the chain of which be interrupted by at least one member selected from the group consisting of —O—, —NH—, —COO— or —NH—COO— groups $R^3$=a linear or branched $C_1$-$C_6$ alkyl group or a phenyl group X=a hydrolysable group a=0, 1 or 2 n=0 or 1

In the most preferred embodiment $R^1$ is a methyl group.

$R^2$ can be, e.g., dimethylene, trimethylene, tetramethylene, pentamethylene, hexamethylene, octamethylene, decamethylene or dodecamethylene. When $R^2$ is branched, it can be e.g. 1,2-propylene, 1,2 and 1,3 butylene etc. When in $R^2$ —O—, —NH—, —COO— or —NH—COO— groups are present, $R^2$ is a polyether, polyamine, an oligoester or a oligourethane.

In a preferred embodiment $R^2$ is a $C_2$-$C_8$ alkylene that can be interrupted by one or more —O— groups.

In a further preferred embodiment $R^2$ is a $C_2$-$C_4$ group, e.g. ethylene, n-propylene, n-butylene, i-propylene, i-butylene or t-butylene. In the most preferred embodiment $R^2$ is n-propylene.

$R^3$ can be, e.g., methyl, ethyl, n-propyl, i-propyl, n-butyl, i-butyl or t-butyl, or the known $C_5$ or $C_6$ alkyl groups.

X can be any hydrolysable group known in the art, e.g., a halogen (F, Cl, Br), an alkoxygroup, a carboxylategroup or a carbonamid group.

When X is a halogen it is preferred that X=Cl.

When X is a carboxylate group, it is preferred to use either acetate or propionate groups and when X is a carbonamid group it is preferred to use acetylamino or propionylamino groups.

When X is an alkoxygroup, any $C_1$ to $C_6$ alkoxy group can be used. It is preferred, however to use a methoxy or ethoxy group.

In a further preferred embodiment X is either Cl or —$OCH_3$ or —$OCH_2$—$CH_3$. In a most preferred embodiment X=—$OCH_3$.

In the most preferred embodiment a=0 and n=1.

In the most preferred embodiment the silane monomer used is:

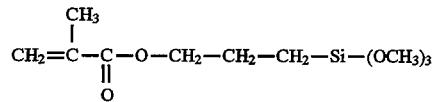

In the aqueous reaction medium a silane monomer according to the general formula I, is present in an amount higher than 1 and lower than 25% in weight (% w/w) with respect to the total of the monomers present in the aqueous reaction medium. In a preferred embodiment said silane monomer is present in the aqueous reaction medium for between 2 and 15% in weight (% w/w) with respect to the total monomer content, in the most preferred embodiment said silane monomer is present in the aqueous reaction medium for between 2 and 10% in weight (% w/w) with respect to the total monomer content. By total monomer content is meant the sum of amount the silane monomer(s) present in the reaction medium and of the amount of α,β-ethylenically unsaturated monomers, different from said silane monomers, as described immediatly below.

The polymer beads comprise essentially polymers of α,β-ethylenically unsaturated monomers, different from, but cross-linked by the silane monomer(s), described above. Useful α,β-ethylenically unsaturated monomers, different from said silane monomers, for the preparation of the polymer beads according to the present invention are, e.g., styrene, vinyltoluene and substituted vinyltoluene e.g. vinyl benzyl chloride and the homologues thereof, chlorostyrene, alkyl methacrylates e.g. methyl methacrylate, ethyl methacrylate, propyl methacrylate, butyl methacrylate and the higher methacrylates, e.g. stearyl methacrylate; substituted alkyl methacrylates e.g. hydroxyethyl methacrylate; butadiene, isobutylene, chlorobutadiene, 2-methylbutadiene; vinyl pyridines e.g. 2- and 4-vinylpyridine, etc. A combination of these monomers as well as one of them alone may be chosen depending on the particular needs. It is possible to combine one or more of the monomers described above with other monomers that themselves do not comply with the requirements described herein for the α,β-ethylenically unsaturated monomers. For instance vinylidene chloride, vinyl chloride, acrylonitrile, and methacrylonitrile are not solvents for their own polymers and can thus not be used for the formation of homopolymers. Nevertheless they can be combined with one or more suitable monomer complying with the requirements set forth to form copolymers that are soluble in the latter monomers.

In a preferred embodiment, said α,β-ethylenically unsaturated monomer, different from said silane monomer(s), is a mixture of at least two monomers selected from the group of methylacrylate, methylmethacrylate, stearylacrylate and stearylmethacrylate. Most preferred said mixture of two monomers comprises a methylester of either acrylic acid or methacrylic acid together with a stearylester of either acrylic acid or methacrylic acid.

The polymer beads comprising a silane hardened polymer are produced by the simultaneous polymerization reaction of the α,β-ethylenically unsaturated monomers and cross-linking reaction, induced by the silanemonomers that are hydrolysed by the water comprised in the aqueous reaction medium. These beads are stabilized by the incorporation of a graft polymer. This graft polymer is formed and incorporated in the polymeric beads simultaneously with the polymerization reaction of the α,β-ethylenically unsaturated monomers and the hardening reaction of the polymeric beads by the silane monomer. In order to incorporate a graft polymer in the polymeric beads according to the present invention a graft-polymerizable polymer is formed. A graft-polymerizable polymer used in the aqueous reaction medium according to the present invention, is a homopolymer or copolymer, which in the presence of radicals and in the conditions described above for the preparation of the polymer beads can be converted into a living molecule, on which by graft-copolymerization side-chains can be implanted.

The formation of the living molecule can occur by withdrawal of a labile hydrogen atom or by conversion of originally implanted unsaturated hydrocarbon groups e.g. acrylate groups in the (co)polymer.

The formation of the living molecule of the graft polymerizable polymer can proceed prior to the reaction forming the cross-linked polymer beads in a separate reaction and the pre-prepared living molecule can then be added to the aqueous reaction medium wherein the formation of the cross-linked polymer beads will proceed. It is preferred according to the present invention, to produce said living molecule in the aqueous reaction medium as is described immediately below and in preparation 1 hereinafter.

Before the beginning of the polymerization the reaction mixture mainly consists of a homogeneous solution at room temperature, in the aqueous reaction medium, of the graft-polymerizable polymer, the free radical-forming polymerization initiator, at least one α,β-ethylenically unsaturated monomer and a silane monomer.

By heating this reaction medium the initiator decomposes and forms free radicals, which then enter into reaction with the dissolved graft-polymerizable polymer either via a labile hydrogen atom or via a reactive position and thus form living molecules, which, while remaining dissolved in the aqueous reaction medium, encounter either reactive monomers or already growing polymer chains of such monomers, thus forming with these reactive monomers or already growing polymer chains a graft copolymer. The graft-polymerizable polymers to be incorporated in the aqueous reaction medium according to the present invention, should:

be sufficiently reactive to form radical-graft-copolymers with the α,β-ethylenically unsaturated monomer(s) present contain, along with hydrophobic groups, hydrophilic groups such as hydroxide, oxide, amide, or carboxylic acid and sulphonic acid groups, which may be neutralized completely or partially with potassium or sodium hydroxide, contain these hydrophilic groups in a number sufficient to make the polymer beads to be formed, stable in aqueous reaction medium, be soluble in the aqueous reaction medium and unsaturated monomer(s).

Suitable graft-polymerizable polymers for use in the preparation of polymer beads are e.g. polyethylene oxide, low molecular weight polyvinyl alcohol, polyvinyl pyrrolidone, co(vinyl alcohol/vinyl acetate) containing 12 mol % of vinyl acetate units and the same copolymer containing 40 mol % of vinyl acetate units, sodium or potassium salts of co(acrylic acid/styrene) containing 40 to 60 mol % of acrylic acid, co(vinyl acetate/crotonic acid), the reaction products of copoly(styrene/maleic anhydride), of copoly(vinyl acetate/maleic anhydride), of copoly (ethylene/maleic anhydride), or of copoly (N-vinyl pyrrolidone/maleic anhydride) with hydroxyalkyl or aminoalkyl(meth) acrylates, co(styrene/maleic acid monosodium salt), and especially the latter copolymer containing 50 mol % of styrene and 50 mol % of maleic acid monosodium salt. Other graft-polymerizable polymers can be used, which comply with the requirements hereinbefore set forth.

In the production of polymeric beads using the one step reaction method using an aqueous reaction medium, according to the present invention, the size of the beads can be determined by the nature of the graft-polymerizable polymer and the amount of said graft-polymerizable polymer present in the aqueous reaction medium.

In the method of the present invention the weight ratio of the graft-polymerizable polymer to the α,β-ethylenically unsaturated monomer(s) is generally comprised between 1.0:100 and 8:100. If the weight of said graft-polymerizable polymer is lowered, e.g., to 0.5 g per 100 g of the α,β-ethylenically unsaturated monomer(s), insufficiently stabilized, coarse polymer particles are obtained, which instead of being spherical have assumed an irregular eliptical shape and size from 10 to 50 μm. Moreover, a large proportion of amorphous precipitate is formed at the same time, which strongly hinders isolation by filtration.

An increase, e.g., to 10.0 g of said graft-polymerizable polymer per 100 g of the α,β-ethylenically unsaturated monomer(s) promotes the solubility and leads to the formation of a shapeless polymer mass.

The polymerization initiator being soluble in the aqueous reaction medium and forming free radicals upon heating is generally present in an amount from 0.1 to 6% by weight based on the amount of monomer(s) present. Suitable polymerization initiators for use in the preparation of the polymer beads according to the invention are persulphates, e.g. potassium, sodium and ammonium persulphates or mixtures thereof. It is also possible to use peroxides, e.g. benzylperoxide, laurylperoxide, as polymerization initiator.

Amounts of $0.5 \times 10^{-3}$ to $15 \times 10^{-3}$ mol of polymerization initiator per liter of reaction medium yield excellent dispersions of polymer beads.

A reduction in the amount of polymerization initiator leads to the formation of larger polymer beads, whereas an increase in the amount of polymerization initiator entails a reduction in the size of the polymer beads. As a consequence, the amount of polymerization initiator in the reaction medium constitutes a parameter that also defines the size of the polymer beads. In other words the results aimed at can be attained by controlling i.a. the exact amount of the polymerization initiator.

It is possible to use the polymerization initiator in amounts outside the range given hereinbefore, though from $15 \times 10^{-3}$ mol on of polymerization initiator per liter of reaction medium the polymer beads are very small. Very low amounts of $0.1 \times 10^{-3}$ mol of polymerization initiator fail to produce dispersions, but mainly form an amorphous precipitate.

The aqueous reaction medium may contain surfactants (ionic, as well as non-ionic), pH regulators, buffers, etc. E.g. it is possible to adjust the pH of the reaction with NaOH and add an organic acid (e.g. citric acid, acetic acid, etc) to the aqueous reaction medium to buffer the pH of the aqueous reaction medium.

When using the reagents described above in the proportions described above and heating the solution obtained to a temperature from 50° C. to the reflux temperature thereof with continuous stirring the polymer beads are formed, by simultaneously i. forming polymer chains from all monomers ($\alpha,\beta$-ethylenically unsaturated monomer(s) and silane monomer(s)) present and precipitation thereof as spherical particles, ii. forming of a small proportion of graft polymer iii. crosslinking of said polymer chains in the bulk of said sperical particles.

The polymeric beads are composed of a nucleus and a kind of "hairy" proturberances surrounding said nucleus.

The nucleus of the beads consists of a bundle of intertwisted and cross-linked polymer chains, which is insoluble in the aqueous reaction medium, obtained by said polymerization reaction of the $\alpha,\beta$-ethylenically unsaturated monomer(s) and said cross-linking reaction by said incorporated silane monomers and of a small proportion of same polymer chains obtained by graft (co) polymerization of the $\alpha,\beta$-ethylenically unsaturated monomer(s), the silane monomers and the initial graft-polymerizable polymer.

The "hairy" proturberances, surrounding the nucleus, are formed by the graft-polymerizable polymer. This graft-polymerizable polymer comprises an hydrophobic portion and an hydrophilic portion. The hydrophobic portion is compatible with the $\alpha,\beta$-ethylenically unsaturated monomer (s) and is at least partially copolymerized with said $\alpha,\beta$-ethylenically unsaturated monomer(s). The hydrophilic groups of said graft-polymerizable polymer extend from the surface of the nucleus into the surrounding aqueous reaction medium as a kind of "hairy" proturberances. These hairy proturberances form a kind of envelope around the nucleus and act a stabilizer for the polymeric beads.

The polymeric beads can easily be separated from the aqueous reaction medium by acidifying the reaction mixture. The polymeric beads precipitate and the precipitate of the beads can be filtrated and dried. After drying the polymeric beads are not agglomerated in the dry precipitate, but the polymeric beads are easily loosened such as to form a mass of separate polymeric beads with high flowability.

The polymeric beads produced according to the present invention present several advantages:

the polymeric beads have a narrow size distribution the polymeric beads are very heat resistant and are insoluble in organic solvents.

the polymeric beads, even dry, exist as separate beads with high flowability the beads have a good compatibility with hydrophilic polymers (e.g. gelatin) as used in photographic materials.

The good compatibility with hydrophilic polymers makes the polymer beads according to the present invention very suited for use in hydrophilic layers of silver halide photographic materials (negative or positive working, black and white or colour, useful in diffusion transfer process, in radiography (both medical and industrial), etc.). The polymer beads according to the present ivention are especially useful for use in outermost hydrophilic layers comprised in a silver halide photographic materal. Since the polymer beads according to the present invention are insoluble in organic solvents, the polymer beads are very useful for incorporation in those layers of photographic silver halide materials that are coated out of organic solvents e.g. backing layers, antihalation layers etc.

The polymer beads according to the present invention are especially useful as additives in coating solutions based on organic solvents. In the finished coating said polymer beads do positively influence the transportation properties of the coating and the sticking behaviour of the coating. A specific example of an application is the use as a spacer/additive in layers of dye sublimation transfer materials, more particularly for use in one of the layers of the dye donor element and/or the dye receiving element. The polymer beads according to the present invention are extremely useful as additives in the dye layer of the dye donor element. When added to said dye layer, the sticking of the dye layer during storage in rolled form is greatly reduced. The polymer beads, according to the present invention, useful for use in the dye layer of a dye donor element have e.g. an average particle diameter (by volume) between 1 and 10 µm, preferably between 1.5 and 6 µm. To minimize the tendency of the polymer beads to stick to each other in the coating solution comprising an organic solvent, it is advantageous to add during the preparation of the polymer beads at least 2.5% in weight of the silane monomer to cross-link the polymer chains contained in said polymer beads.

Another useful application of the cross-linked polymer beads according to the present invention, is the use as spacing agent in reductor transfer materials as described in European Patent Application 94200612.3 and European Patent Application 94200788.1. It is especially preferred to use said polymer beads in the reductor donor layer.

Still another useful application of the cross-linked polymer beads according to the present invention, is the use as spacing agent in polymeric sheet or web materials that are prepared by biaxial stretching at elevated temperatures and that are eventually heat-set and where the spacing agents have to be present before the stretching and eventual heat-setting. Non limitative examples of polymeric sheet or web materials, in the production whereof the cross-linked polymer beads according to the present invention are very useful are biaxially oriented and heat-set polyester sheet or web materials (e.g. polyethylene terephathalate films, polyethylene naphthalate rims, etc), biaxially oriented polypropylene web or sheet materials, etc.

The method according to the present invention is illustrated in the examples hereinafter:

EXAMPLES

PREPARATION 1 (P1)

Polymerization reaction

The reacion was carried out in a 20 liter double-walled glass cylinder, equipped with a reflux cooler, a stirrer, a thermometer and an inlet, above liquid level, for $N_2$. In this reaction vessel were successively placed, at room temperature:

105.0 g of a 20% (in weight) aqueous solution of co(styrene/maleic acid anhydride), adjusted to pH=7.0, 1817.2 g of distilled water, 2.0 g of citric acid and 4.2 g of potassiumpersulfate.

The reaction vessel was continuously rinsed with $N_2$ and kept free from air.

The above mixture was stirred at 60 rpm, while the temperature was raised to 64° C. Once this temperature was reached (after about 75 minutes), the reaction vessel was thermostatized at 64° C., and kept for another 75 minutes at 64° C.

Next, 6364.9 g of methanol were added to the reaction mixture over a period of 30 minutes. After the addition of the methanol, a mixture of 42.0 g of stearylmethacrylate, 52.5 g of methacryloxypropyl-trimethoxysilane, 2005.5 g of methelymethacrylate and 42.0 g of ARKOPAL NO60 (trade name for (iso)$H_{19}C_9$-Phenyl-O$(CH_2CH_2O)_6$-H available from Hoechst added.

About 15 minutes after the addiditon of the above mixture, the reaction mixture became turbid.

After 18 hours op polymerization, the reaction vessel was cooled to room temperature.

The dispersion of polymer beads of a crosslinked copolymer of methylmethacrylate, stearylmethacrylate and methacryloxypropyl, trimethoxysilane, stabilized by a graft polymer of co(styrene/maleic acid monosodium salt) was filtered trough coarse filter paper. The dispersion contained 20 g of polymeric beads pro 100 g of the dispersion.

Separation of the polymer beads from the dispersion 10 kg of the dispersion, comprising 20 g of polymeric beads pro 100 g of the dispersion, were homogenized by stirring. While stirring 240 g of 5.7N solution of HCl was added to bring the pH at about 1.

The polymer beads precipitated quickly and could easily be separated from the liquid by filtering under reduced pressure.

After washing three consecutive times by a methanol/water mixture (23/77 volume ratio) the filtrate was dried, first a 50° C. under atmospheric pressure, then at 50° C. under reduced pressure (about 133 P) until a constant weight was reached. The dried filtrate was easily separated into a free flowing powder of separate polymer beads.

PREPARATIONS 2 to 5 (P2, P3, P4, P5)

Preparation 1 was repeated, except for the proportions of the reagents. The reagents used in the preparations 1 to 5 are summarized in table 1.

The particle size distribution of the polymer beads prepared according to preparation 1 to 5 were measured with a COULTER COUNTER (registered trade mark) MULTIZ-ISER particle size analyzer operating according to the principles of electrolyte displacement in narrow aperture and marketed by COULTER ELECTRONICS Corp. Northwell Drive, Luton, Bedfordshire, LC 33, UK. In said apparatus particles suspended in an electrolyte (e.g. aqueous sodium chloride) are forced through a small aperture, across which an electric current path has been established. The particles passing one-by-one each displace electrolyte in the aperture producing a pulse equal to the displaced volume of electrolyte. This particle volume response is the basis for said measurement. The results are summarized in table 2.

TABLE 1

| | Amount of reagents in g pro preparation | | | | |
|---|---|---|---|---|---|
| Number Prep. | Polymer* | Water | Citric acid | $K_2S_2O_8$ | Methanol |
| P1 | 105.0 | 1817.2 | 2.0 | 4.20 | 6364.9 |
| P2 | 140.0 | 1383.0 | 1.4 | 5.25 | 4043.3 |
| P3 | 280.0 | 1160.7 | 1.4 | 5.25 | 4154.1 |
| P4 | 140.0 | 1272.7 | 1.4 | 5.25 | 4154.1 |
| P5 | 162.0 | 941.3 | 2.5 | 3.14 | 4287.5 |

* = 20% aqueous solution of co(styrene/maleic acid monosodium salt)

| | Amount of reagents in g pro preparation | | | |
|---|---|---|---|---|
| Number Prep. | Stearyl-methacrylate | Silane derivative** | Methyl methacrylate | Arkopal NO60*** |
| P1 | 42.0 | 52.5 | 2005.5 | 42.0 |
| P2 | 28.0 | 140.0 | 1232.3 | 28.0 |
| P3 | 28.0 | 70.0 | 1302.0 | 28.0 |
| P4 | 28.0 | 140.0 | 1237.0 | 28.0 |
| P5 | 31.4 | 15.7 | 1524.0 | 32.4 |

** = methacryloxypropyl, trimethoxysilane
*** = trade name for (iso)$H_{19}C_9$—Phenyl—O$(CH_2CH_2O)_6$—H available from Hoechst AG, Frankfurt, Germany

TABLE 2

| Number of prep. | Parameters of the particle size distribution | | | |
|---|---|---|---|---|
| | $d_{v50}$* | $d_{n50}$** | $d_{v50}/d_{n50}$ | $Q_{dv}$*** |
| P1 | 5.81 μm | 5.64 μm | 1.03 | 0.04 |
| P2 | 2.05 μm | 2.01 μm | 1.02 | 0.05 |
| P3 | 2.55 μm | 2.54 μm | 1.01 | 0.03 |
| P4 | 3.27 μm | 3.23 μm | 1.01 | 0.04 |
| P5 | 5.10 μm | 5.00 μm | 1.02 | 0.04 |

*$d_{v50}$: average diameter by volume: 50% of the particles have a diameter lower than $d_{v50}$ and 50% of the particles have a diameter higher than $d_{v50}$.
**$d_{n50}$: average diameter by number: 50% of the particles have a diameter lower than $d_{n50}$ and 50% of the particles have a diameter higher than $d_{n50}$.

***$Q_{dv} = \dfrac{d_{v25} - d_{v75}}{d_{v25} + d_{v75}}$ wherein $d_{v75}$ means the diameter (by volume in μm) where 75% of the particles have a diameter higher than $d_{v75}$ and $d_{v25}$ means the diameter (by volume in μm) where 25% of the particles have a diameter higher than $d_{v25}$. The lower the figure, the narrower the particle size distribution.

COMPARATIVE PREPARATION

Non cross-linked polymethylmethacrylate beads stabilized with a graft copolymer of methylmethacrylate and co(styrene/maleic anhydride) were prepared in essentially the same way as the cross-linked polymer beads of preparation 1, except that NO silane hardener was present.

The preparation of these polymeric beads is explained in detail immediatly below.

COMPARATIVE PREPARATION 1 (CP1)

At room temperature 1566 g of a 10% aqueous solution of co(styrene/maleic acid anhydride) adjusted to pH 7.0 by means of sodium hydroxide, 4617 ml of distilled water, and 48.6 g (12.5×10$^{-3}$ mol per liter of reaction medium) of potassium persulphate were placed successively in a 20.0 liter reaction vessel equipped with a stirrer, a thermometer, and a nitrogen inlet above the liquid level. During the entire reaction the atmosphere in the reaction flask was rinsed continuously with nitrogen to keep it free from air.

The mixture was stirred constantly at 140 rpm. After 10 minutes of stirring, the persulphate had dissolved and 5400 ml of ethanol and 3192 ml (3.0 kg) of methyl methacrylate were added at once.

Stirring was then continued for 90 minutes at room temperature. The reaction mixture remained turbid all the time.

Next, the reaction mixture was heated gradually with a waterbath at 65° C. As soon as the temperature in the reaction flask reached 30° C., the reaction mixture became transparent.

At a temperature of 55° to 60° C. the first turbidity was usually seen. After a total heating time of 30 minutes the temperature in the reaction vessel reached 65° C.

As a consequence of the exothermic polymerization reaction the temperature rose gradually to 80° C. At this very moment a weak reflux took place.

The increase in temperature from 60° to 80° C. took almost 45 minutes. During this period the clear solution changed into a milky white dispersion.

The temperature remained for almost 5 minutes a 80° C. and then started falling gradually to 65° C. in about 30 minutes.

Subsequently, the dispersion was stirred for 16 hours on the waterbath at 65° C.

After the polymerization the dispersion was cooled to 30° C. with stirring.

Finally, the dispersion was filtered through a nylon cloth with meshes sizing 75×75 μm.

Yield: 13.19 kg of dispersion of polymethyl methacrylate beads stabilized with a graft copolymer of methyl methacrylate and co(styrene/maleic acid monosodium alt) comprising 23.9 g of beads per 100 g of dispersion (yield of 98.4%) at pH 5.2. The average size of the polymer beads measured with the aid of the COULTER NANO-SIZER was 2.190 μm. The COULTER COUNTER Model TA II gave an average size of the beads of 2.02 μm when measured in number percent and of 2.09 μm when measured in weight percent.

RESULTS

The solubility of the polymeric beads, prepared according to preparation 1 to 5 (P1 to P5) and comparative preparation 1 (CP1), were measured as follows: 20% in weight (% w/w) of polymeric beads were brought in dioxane. The dispersion of the beads in dioxane was stirred for 24 hours at room temperature.

The swelling of the polymer beads in Methylethylketone (MEK) was measured by comparing the average diameter of the polymer beads measured when the beads are dispersed in water with the average diameter after swelling the beads in MEK. This swelling was performed as follows: 0.25 g of polymer beads were brought into 50 ml of MEK and were ultrasonically stirred for 1 minute at 100 W. The average diameter ($d_{v50}$) was measured by laser diffraction in a Coulter LS (registrated trademark of COULTER ELECTRONICS Corp. Northwell Drive, Luton, Bedfordshire, LC 33, UK The results are found in table 3.

TABLE 3

| Preparation number | % of silanemonomer in the polymeric beads | Swelling in MEK in % | Solubility in dioxane in % |
|---|---|---|---|
| P1 | 2.5% | 58 | 0 |
| P2 | 10% | 25 | 0 |
| P3 | 5% | 33 | 0 |
| P4 | 10% | 22 | 0 |
| P5 | 1% | n.m. | 100 |
| CP1 | 0% | n.m. | 100 | n.m = Not Measured, while the beads dissolved.

We claim:

1. A method for the preparation of finely divided solid spherical polymer beads having an average particle size between about 0.1 and about 10 μm and having a glass transition temperature of at least 40° C., comprising the steps of:

A) dissolving in an aqueous reaction medium:

1) a silane monomer corresponding to the following general formula:

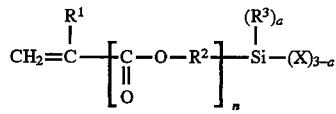

wherein $R^1$=H or $CH_3$ $R^2$=a linear or branched $C_2$-$C_{12}$—alkylene group, the chain of which may be interrupted by at least one member selected from the group consisting of —O—, —NH—, —COO— or —NH—COO— groups $R^3$=a linear or branched $C_1$-$C_6$ alkyl group or a phenyl group X=a hydrolysable group a=0, 1 or 2 n=0 or 1

2) at least one α,β-ethylenically unsaturated monomer, different from said silane monomer, capable of forming a polymer that is soluble in the α,β-ethylenically unsaturated monomer present in said aqueous reaction medium but which is insoluble in water 3) a free radical-forming polymerization initiator that is soluble in the aqueous reaction medium, and 4) a graft-polymerizable polymer containing hydrophilic groups, and capable of forming a graft polymer that remains soluble in said aqueous reaction medium, wherein the amount of said silane monomer present in said aqueous reaction medium is higher than 1% and lower than 25% in weight with respect to the total monomer content and the weight ratio of said graft-polymerizable polymer to said monomer is in the range from 1.0:100 to 8:100 and the weight ratio of polymerization initiator to monomer from 0.1:100 to 6:100, and B) heating the solution to a temperature from 50° C. to the reflux temperature thereof with continuous stirring.

2. A method according to claim 1, wherein the amount of said silane monomer present in said aqueous reaction medium is between 2 and 15 weight % with respect to the total monomer content.

3. A method according to claim 1, wherein in said silane monomer $R^2$ is a $C_2$-$C_8$ alkylene that may be interrupted by one or more —O— groups.

4. A method according to claim 1, wherein in said silane monomer X is Cl or —$OCH_3$ or —$OC_2H_5$.

5. A method according to claim 1, wherein said silane monomer has the formula:

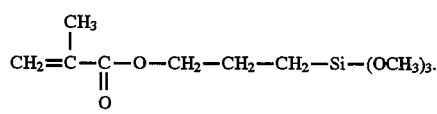

6. A method according to claim 1, wherein said aqueous reaction medium comprises water and a lower aliphatic alcohol and the weight ratio of said lower aliphatic alcohol to water is between 40:60 and 85:15.

7. A method according to claim 6, wherein said lower aliphatic alcohol is methanol.

8. A method according to claim 1, wherein said graft-polymerizable polymer is co(styrene/maleic acid mono alkali metal salt).

9. A method according to claim 1, wherein said $\alpha,\beta$-ethylenically unsaturated monomer, different from said silane monomer, is a mixture of at least two monomers selected from the group consisting of methylacrylate, methylmethacrylate, stearylacrylate and stearylmethacrylate.

* * * * *